United States Patent [19]

Gatzke et al.

[11] Patent Number: 5,307,815
[45] Date of Patent: May 3, 1994

[54] ULTRASONIC TRANSDUCER WITH INTEGRATED VARIABLE GAIN AMPLIFIER

[75] Inventors: Ronald D. Gatzke, Lexington; Michael P. Anthony, Chelmsford, both of Mass.

[73] Assignee: Hewlett-Packard Company, Palo Alto, Calif.

[21] Appl. No.: 985,722

[22] Filed: Dec. 4, 1992

[51] Int. Cl.⁵ ............................................. A61B 8/00
[52] U.S. Cl. .............................. 128/660.01; 73/631
[58] Field of Search ............ 128/660.01, 661.01, 128/660.1, 662.06; 73/631, DIG. 900

[56] References Cited

U.S. PATENT DOCUMENTS

| | | | |
|---|---|---|---|
| 3,469,231 | 9/1969 | Geiling et al. | 340/6 |
| 3,715,577 | 2/1973 | Bohman | 340/6 R |
| 4,290,310 | 9/1981 | Anderson | 73/626 |
| 4,489,729 | 12/1984 | Sorenson et al. | 128/660 |
| 4,508,122 | 4/1985 | Gardineer et al. | 128/660 |
| 4,819,652 | 4/1989 | Micco | 128/661.09 |
| 4,868,797 | 9/1989 | Soltz | 367/98 |
| 4,917,097 | 4/1990 | Prodin et al. | 128/661.01 |
| 4,926,380 | 5/1990 | Harada | 367/7 |
| 4,974,558 | 12/1990 | Katakura et al. | 128/661.01 |
| 5,046,053 | 9/1991 | Gilchrist | 367/98 |
| 5,050,611 | 9/1991 | Takamizawa et al. | 128/661.09 |
| 5,183,048 | 2/1993 | Eberle | 128/662.06 |
| 5,186,177 | 2/1993 | O'Donnell et al. | 128/662.06 |

OTHER PUBLICATIONS

Gatzke, R. D. et al., Electronic Scanner for a Phased-Array Ultrasound Transducer, Hewlett-Packard Journal, Dec. 1983, pp. 13-19.

Jundanian, R. H. et al., Control Hardware for an Ultrasound Imaging System Hewlett-Packard Journal, Dec. 1983, pp. 3-5.

*Primary Examiner*—Francis Jaworski

[57] ABSTRACT

An ultrasound transducer apparatus for use with an ultrasound imaging system which includes signal transmission and signal receiving circuitry coupled to the transducer through a cable. The transducer apparatus includes a transducer for converting ultrasonic energy into electronic signals and a variable gain amplifier circuit having an input coupled to the transducer and an output coupled to the cable for amplifying the electronic signals at a gain determined by a gain control signal from the imaging system. The transducer apparatus is typically hand-held, and the variable gain amplifier circuit is preferably mounted in the hand-held unit in close proximity to the transducer element. The variable gain amplifier circuit preferably includes a preamplifier and a variable gain amplifier. Preferably, the transducer is a transducer array including a plurality of transducer elements, each having a preamplifier and a variable gain amplifier associated with it.

19 Claims, 3 Drawing Sheets

ULTRASONIC TRANSDUCER WITH INTEGRATED VARIABLE GAIN AMPLIFIER

FIELD OF THE INVENTION

The present invention relates generally to ultrasonic imaging and, more particularly, to an ultrasonic transducer having variable gain amplifier circuitry integrated into the transducer.

BACKGROUND OF THE INVENTION

Ultrasound generally refers to sound waves that have a frequency above the range of human hearing. In a typical ultrasonic imaging system, short bursts of ultrasonic energy are directed into a body with a hand-held transducer. The returning reflected energy or echoes are received with the same transducer. The signals representing the reflected energy are processed and formatted into a video image of the target region. Ultrasonic imaging is used widely in medical applications to non-invasively observe structures within the human body, such as cardiac structures, the vascular system, the fetus, the uterus, the abdominal organs and the eye.

The ultrasonic transducer typically comprises an array of transducer elements, such as piezoelectric crystals, which convert electric signals to acoustic energy sufficient to penetrate the various structures in the human body. The transducer elements also convert the relatively weak returning echoes into electric signals which are processed into an image. The construction and function of an ultrasonic transducer array are well known in the art.

An electronic scanning subsystem controls the transmission and reception of ultrasound signals by the transducer elements in the array. The construction and theory of operation of such a scanner for an ultrasonic imaging system are outlined in an article entitled "Electronic Scanner for Phased-Array Ultrasound Transducer" Gatzke et al., *Hewlett Packard Journal*, December 1983, which is hereby incorporated by reference. The scanner controls the steering and focusing of the ultrasonic beam. The scanner includes, in the receiving path from each transducer element, a time gain compensation (TGC) amplifier. Echoes from structures near the transducer array are relatively large in amplitude, whereas echoes from structures deep within the body, received later, are relatively small in amplitude. The TGC amplifier compensates for the wide range in received amplitudes by providing a gain that varies with time as the ultrasonic echoes are being received.

The range of signals produced by the transducer element array may be larger than the range of signals that can be received by the receiving circuitry within the scanner subsystem. Accordingly, the noise performance of the receiving amplifier within the scanner becomes critical to the overall noise performance of the system. Also, the dynamic range of the system will be limited by the ability of the receiving circuitry within the scanner to handle very high signal levels.

A hand-held probe containing the transducer array is typically connected to the receiving and processing electronics of the system through a connecting cable. This arrangement can cause impedance matching problems. If the impedance of each transducer element is not matched to the impedance of the cable, waveform distortion can result. For modern acoustic transducer elements, the transducer element impedance is typically much higher than the impedance of the cable.

One solution to the impedance matching problem is to provide a fixed gain preamplifier after each transducer element to drive the cable. U.S. Pat. No. 4,489,729 issued Dec. 25, 1984 to Sorenson et al discloses a fixed gain linear preamp mounted in the scanner head of an ultrasound imaging system. A limitation with this approach is the amount of gain which can be employed in the preamplifier. If the gain is low (unity gain is typical), the noise performance of the system receiving amplifier is critical to the overall noise performance of the imaging system. Further, noise degradation can result from external electromagnetic interference (EMI) sources due to the relatively low signal levels produced by the preamplifier. If the gain of the preamplifier is high, the dynamic range of the system may be limited by the inability of system receiver to handle high signal levels.

SUMMARY OF THE INVENTION

Accordingly, a need exists for an ultrasonic transducer apparatus which contains receiving circuitry for both matching the impedance of the transducer element to the impedance of the cable and matching the dynamic range of the transducer element to the dynamic range of the receiving circuitry in order to achieve optimum waveform fidelity.

According to the present invention, an ultrasonic transducer apparatus for use with an ultrasonic imaging system is provided. The imaging system comprises signal transmission and signal receiving circuitry coupled to the transducer apparatus through a cable. The transducer apparatus comprises a transducer for converting ultrasonic energy into electronic signals and variable gain amplifier means having an input coupled to the transducer and an output coupled to the cable for amplifying the electronic signals at a gain determined by a gain control signal from the imaging system. The transducer apparatus is typically hand-held, and the variable gain amplifier means may be mounted in the hand-held unit in close proximity to the transducer.

The variable gain amplifier means preferably comprises a preamplifier having an input coupled to the transducer and a variable gain amplifier having an input coupled to the output of the preamplifier and an output coupled to the cable. The input impedance of the preamplifier is appropriately matched to the impedance of the transducer, and the output impedance of the variable gain amplifier is appropriately matched to the impedance of the cable.

In a preferred embodiment, the transducer apparatus comprises a transducer array having a plurality of transducer elements, each having a variable gain amplifier circuit mounted in close proximity thereto. Each variable gain amplifier circuit can be connected to one or more transducer elements. Similarly, each transducer element can be connected to one or more variable gain amplifier circuits.

The variable gain amplifier means preferably has high gain for relatively low level input signals so that the noise performance depends primarily on the transducer element, and the effects of electromagnetic interference are reduced. For high level input signals, the gain is reduced so that the receiving circuitry will not be overloaded. The gain control signal can incorporate the time gain control function of the imaging system wherein the gain is varied as a function of time during reception of ultrasound echoes to compensate for amplitude variations.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
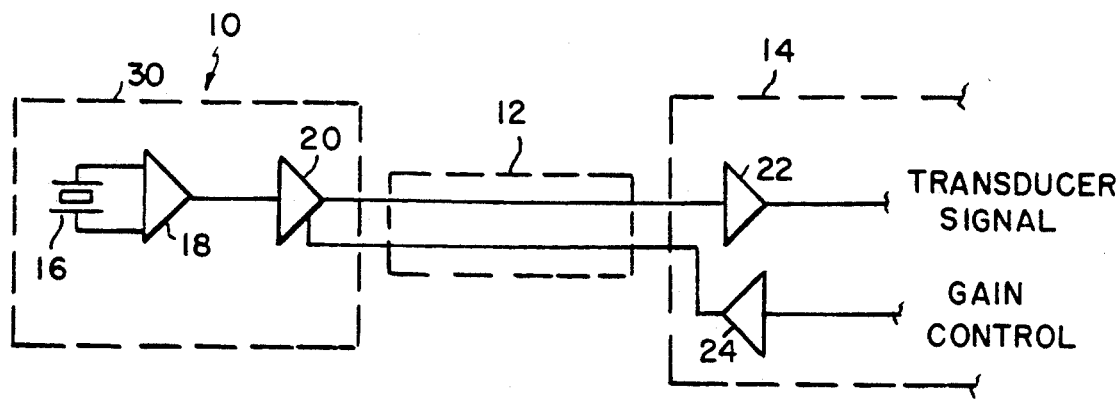
FIG. 1 is a block diagram of the receiving circuitry of an ultrasonic imaging system including an ultrasonic transducer in accordance with the present invention.

With reference to FIG. 1, a portion of the receiving path of an ultrasonic imaging system is shown. The receiving path comprises transducer 10 connected by a cable 12 to a system processor 14. Cable 12 may be a conventional cable as used in prior art ultrasonic imaging systems to connect a hand-held transducer to a system processor. System processor 14 includes a receiver 22 and a gain control generator 24, the construction and function of which are described in an article entitled "Control Hardware for an Ultrasound Imaging System", Jundanian et al., *Hewlett Packard Journal*, December 1983, which is hereby incorporated by reference. Gain control generator 24 supplies a gain control signal to a variable gain amplifier 20 of transducer 10, as explained hereinafter.

Transducer 10 comprises a transducer element 16, which is typically a piezoelectric crystal, a transmit/receive switch (not shown), a preamplifier 18 and a variable gain amplifier 20. The transducer element 16 is coupled through the transmit/receive switch to the input of preamplifier 18. The use of transmit/receive switches for receiver protection is well known in the art. This element is omitted from the drawings for ease of understanding. The output of preamplifier 18 is coupled to the input of variable gain amplifier 20. The output of variable gain amplifier 20 is connected to cable 12.

The preamplifier 18 and the variable gain amplifier 20 are located in close proximity to transducer element 16 and are preferably integrated into a hand-held transducer assembly. The preamplifier 18 and the variable gain amplifier 20 are preferably mounted within a transducer housing 30 as close as is practical to transducer element 16. The conductors interconnecting transducer element 16 and preamplifier 18 are kept as short as possible, preferably less than about three inches. When the conductors interconnecting transducer element 16 and preamplifier 18 are short, pickup of EMI is minimized.

Figure 2:
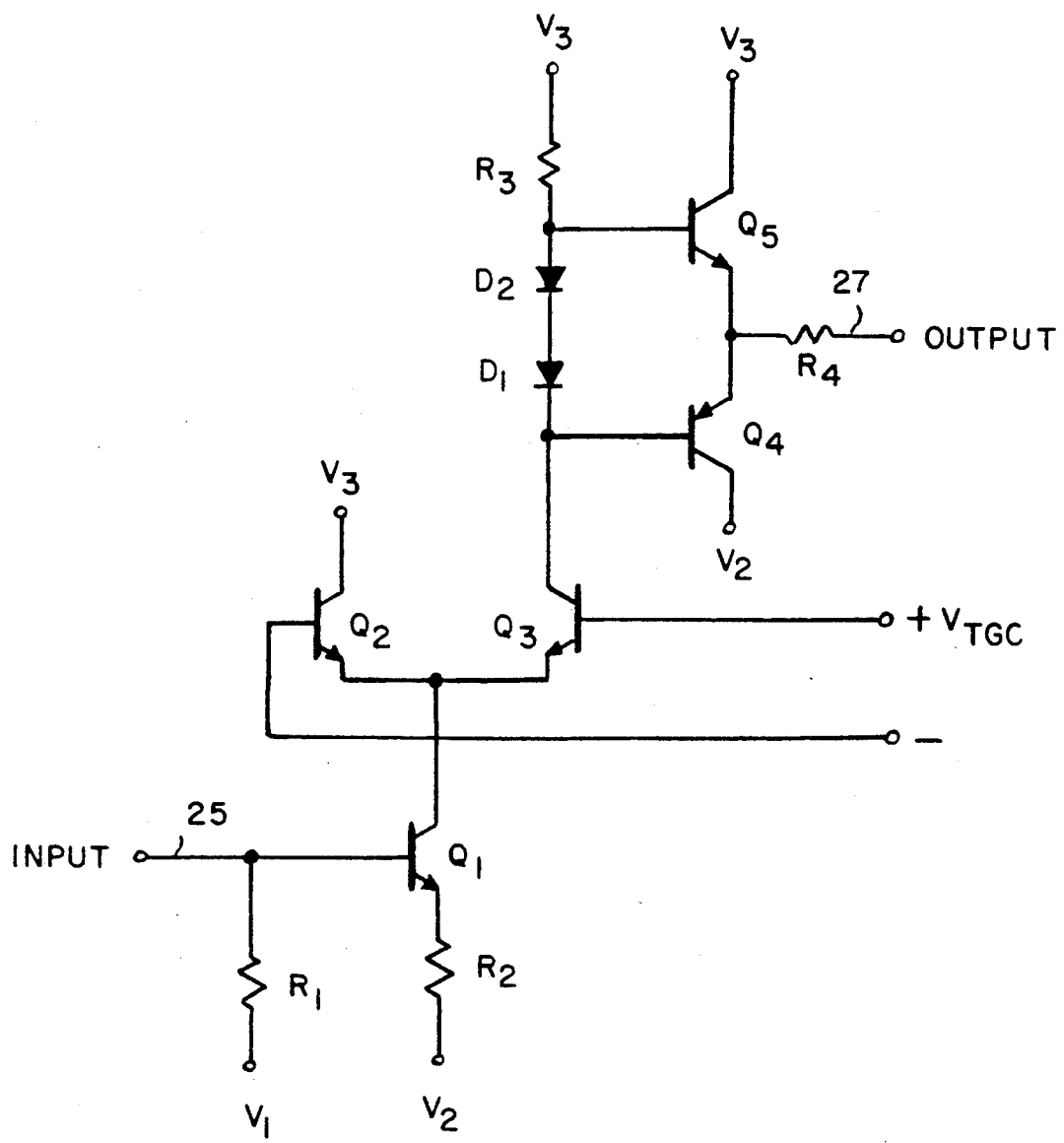
FIG. 2 is a schematic diagram of an example of the preamplifier and variable gain amplifier of the transducer of FIG. 1.

A suitable circuit for implementation of preamplifier 18 and variable gain amplifier 20 is shown in FIG. 2. It will be understood that other circuits can be utilized within the scope of the present invention. The received signal from transducer element 16 (FIG. 1) is applied to an input terminal 25. A transistor $Q_1$ and resistors $R_1$ and $R_2$ constitute a common emitter preamplifier. The input signal is applied to the base of transistor Q. Resistor $R_1$ supplies base bias current to transistor Q and provides the desired load resistance to the transducer element 16. The transconductance of the preamplifier is set primarily by resistor $R_2$, with some effect from the $g_m$ of transistor Q. The output of the common emitter preamplifier is the collector current of transistor $Q_1$.

Transistors $Q_2$ and $Q_3$ form a differential pair having a current splitting ratio set by the gain control signal $V_{TGC}$ applied between the bases of transistors $Q_2$ and $Q_3$. The emitters of transistors $Q_2$ and $Q_3$ are connected to the collector of transistor $Q_1$. The collector current of transistor $Q_1$ times the current splitting ratio flows through resistor $R_3$, diodes $D_1$ and $D_2$ and the collector of transistor $Q_3$. The voltage gain from the input terminal 25 to resistor $R_3$ is approximately $R_3/R_2$ times the current splitting ratio of the transistors $Q_2$ and $Q_3$ (which ranges from 0 to 1).

Diodes $D_1$ and $D_2$ and transistors $Q_4$ and $Q_5$ form a complementary emitter follower output stage which has low output impedance and is capable of driving the cable 12 (FIG. 1) connected to output terminal 27. A resistor $R_4$ matches the cable impedance to the low impedance of the output stage. The output stage has a voltage gain of approximately unity. Diodes $D_1$ and $D_2$ provide operating bias for transistors $Q_4$ and $Q_5$.

In the illustrative embodiment, preamplifier 18 and variable gain amplifier 20 provide impedance matching between the transducer element 16 and cable 12. The component values of preamplifier 18 are selected to appropriately match the impedance of preamplifier 18 at input terminal 25 with the impedance of transducer element 16 to achieve optimum waveform fidelity and noise performance. Similarly, the component values of variable gain amplifier 20, particularly the value of resistor $R_4$, are selected such that the impedance of variable gain amplifier 20 at output terminal 27 is matched to the impedance of cable 12 to achieve optimum waveform fidelity.

In a preferred implementation, preamplifier 18 has a fixed gain, typically in a range of 1 to 10. The gain provided by preamplifier 18 and variable gain amplifier 20 increases the signal level before the signal passes through the cable 12 and effectively reduces any noise contribution from either the cable, its connectors, or the receiving electronics in system processor 14. This occurs because the signal level is increased at the transducer head, and the ratio of the amplified signal to any subsequent noise contribution is increased. For the same reason, the gain provided by preamplifier 18 and variable gain amplifier 20 prior to cable 12 reduces the effective EMI antenna receiving area. In this manner, only transducer element 16 and the conductors that couple transducer element 16 to preamplifier 18 will be highly susceptible to external EMI fields. The cable signals, which are being driven at relatively high levels and low impedance, have reduced sensitivity to such external EMI fields.

The preamplifier 18 and the variable gain amplifier 20 in transducer 10 permit the wide range of signals produced by transducer element 16 to be dynamically mapped to the smaller range acceptable to receiver 22 of system processor 14. The use of preamplifier 18 and variable gain amplifier 20 within transducer 10 enables low level signals from transducer element 16 to be amplified to much higher levels, thereby reducing the noise sensitivity of the succeeding stages in system processor 14 as described above. Further, use of preamplifier 18 and variable gain amplifier 20 enables high level signals from transducer element 16 to be amplified at lower gain or to be attenuated, thereby reducing the risk of overload of the succeeding stages in system processor 14.

Figure 3:
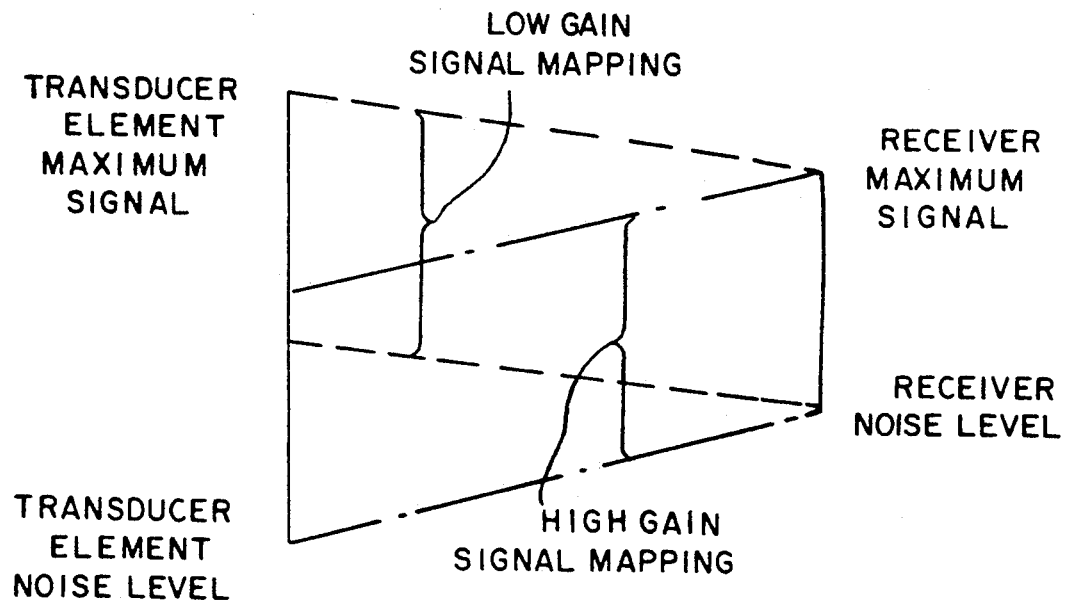
FIG. 3 is a conceptual diagram of the dynamic range mapping of the transducer signals in accordance with the present invention.

FIG. 3 illustrates conceptually how variable gain amplifier 20 maps the larger transducer element signal range to a smaller range received by receiver 20. As can be seen from the left-hand side of FIG. 3, the transducer element signal range, i.e. the input of preamplifier 18, extends from the transducer element noise level to the maximum element signal level. The acceptable input range of receiver 22, i.e. the acceptable output signal range of variable gain amplifier 20, extends from the noise level of receiver 22 to the maximum allowable signal of receiver 22.

For large input signals from transducer element 16, as are encountered when imaging very reflective or close targets, the gain of amplifier 20 is set relatively low and may attenuate the transducer element signal. Variable gain amplifier 20 then drives the receiver 22 at an acceptable level without overdriving the receiver. Accordingly, the possibility of signal distortion in succeeding stages of system processor 14 is reduced. This mapping is indicated by the dashed lines in FIG. 3.

For low level signals from transducer element 16, i.e. those that are at or near the transducer element noise level, the gain of amplifier 20 is set relatively high. Variable gain amplifier 20 amplifies the signal level so that its output is higher than the noise level of receiver 22, as indicated by the broken dashed lines in FIG. 3. Then, the noise performance of the imaging system is determined by the noise level characteristics of transducer element 16 and not those of receiver 22. As a result, the overall accuracy of the imaging system is improved.

The gain control signal, $V_{TGC}$, supplied to variable gain amplifier 20 from system processor 14 is typically derived from the time gain control (TGC) function of the imaging system, which can be modified in real time by the system operator to maximize system performance. The derivation of a gain control signal from the TGC signal is within the scope of one skilled in the art. By varying the gain of amplifier 20 in response to the TGC signal, amplifier 20 can track the level of the transducer element signals as they return from the target region.

Figure 4:
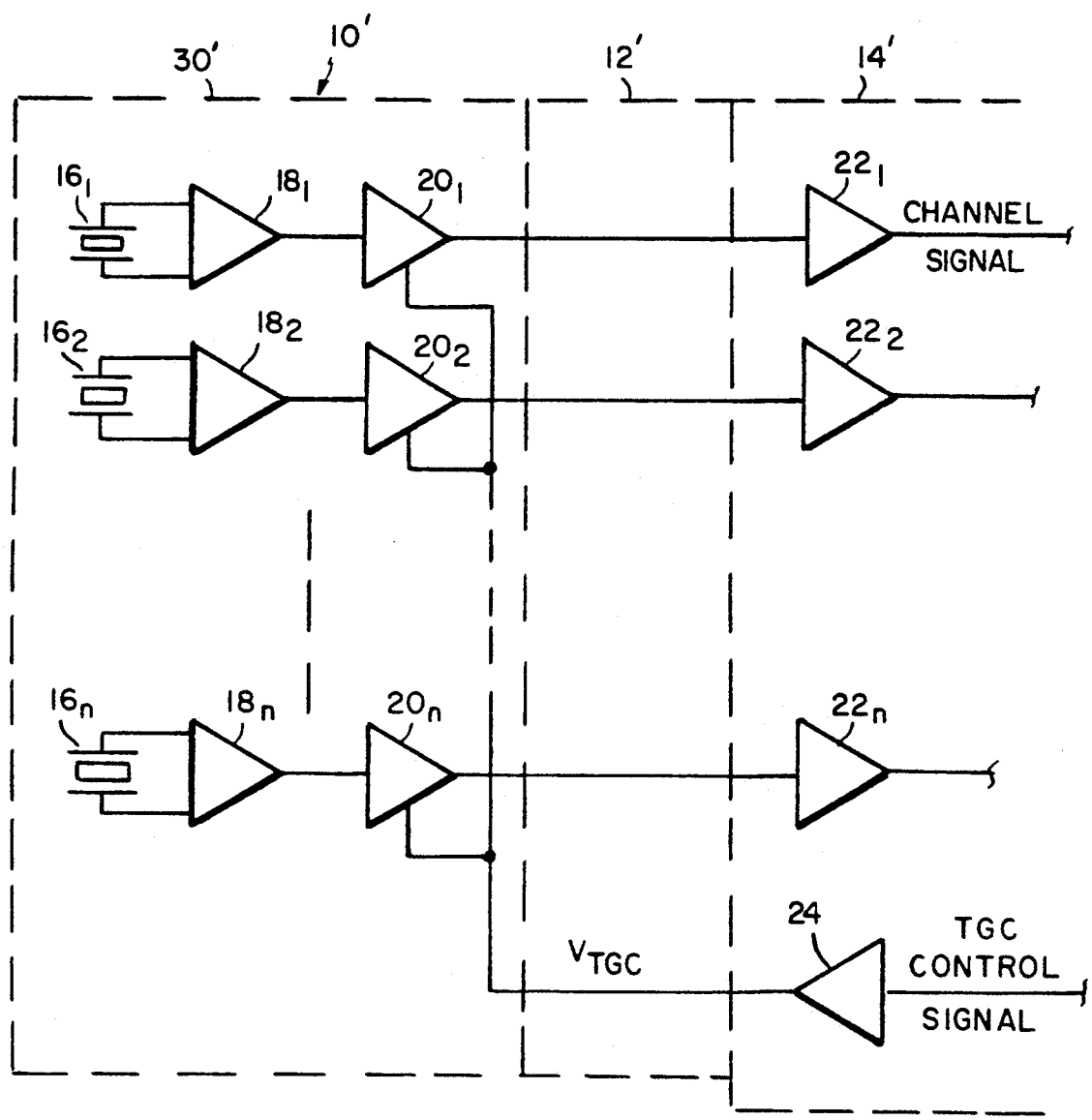
FIG. 4 is a block diagram of receiving circuitry for a transducer having multiple transducer elements and multiple preamplifier and variable gain amplifiers in accordance with the present invention.

Although FIG. 1 illustrates a transducer 10 having a single transducer element 16, a single preamplifier 18 and a single variable gain amplifier 20, it will be obvious to those skilled in the art that such a topology is useful for a transducer having a plurality of transducer elements in an array configuration. In the embodiment disclosed in FIG. 4, each transducer element $16_1, 16_2, \ldots 16_n$ of an array has associated therewith a preamplifier $18_1, 18_2, \ldots 18_n$ and a variable gain amplifier $20_1, 20_2, \ldots 20_n$. The preamplifiers $18_1, 18_2, \ldots 18_n$ and the variable gain amplifiers $20_1, 20_2, \ldots 20_n$ are located in close proximity to the respective transducer elements $16_1, 16_2, \ldots 16_n$ and are preferably integrated into a housing 30' of a hand-held transducer assembly 10'. The design of variable gain amplifier $20_1, 20_2, \ldots 20_n$ and preamplifier $18_1, 18_2, \ldots 18_n$ (as shown for example in FIG. 2 and described above) is suitable for large-scale integration, allowing large numbers of amplifier channels to be integrated into a single hand-held transducer apparatus. The outputs of the variable gain amplifier $20_1, 20_2, \ldots 20_n$ are coupled through cable 12' to the inputs of receivers $22_1, 22_2, \ldots 22_n$, respectively, which supply individual channel output signals for use by system processor 14'.

The gain control generator 24 supplies a gain control signal, $V_{TGC}$, to the variable gain amplifiers $20_1, 20_2, \ldots 20_n$. In the embodiment illustrated in FIG. 4, the gain control signal, $V_{TGC}$, is applied to all variable gain amplifiers in parallel to minimize wiring in cable 12. Alternatively, more than one gain control signal can be used, or each transducer element can have its own gain control signal.

The transducer apparatus of the present invention has been described thus far in configurations wherein one transducer element is connected to the input of one preamplifier. In another configuration within the scope of the invention, two or more transducer elements are connected to the input of one preamplifier, and the signals from the transducer elements connected to one preamplifier are effectively summed. In yet another configuration within the scope of the present invention, two or more preamplifiers are connected to one transducer element.

As noted above, the transducer elements $16_1, 16_2, \ldots 16_n$, the preamplifiers $18_1, 18_2, \ldots 18_n$ and the variable gain amplifiers $20_1, 20_2, \ldots 20_n$ are preferably integrated into a housing 30' of a hand-held transducer assembly 10'. Alternatively, the transducer elements and the circuitry (including preamplifiers and variable gain amplifiers) can be in separate units at the end of cable 12' and interconnected by a short cable.

The circuitry in the transducer apparatus of the invention has been described above as a separate preamplifier and variable gain amplifier. However, the preamplifier and the variable gain amplifier can be combined into a single variable gain amplifier circuit having a low noise input.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A transducer apparatus for use with an ultrasonic imaging system, the transducer apparatus comprising:
    a cable having a first end for coupling to said ultrasonic imaging system, and a second end;
    a transducer, located at the second end of said cable, for converting ultrasonic energy into electronic signals for transmission through said cable to said ultrasonic imaging system; and
    a variable gain amplifier, located at the second end of said cable, having an input coupled to said transducer and an output coupled to the second end of said cable for amplifying said electronic signals at a gain determined by a gain control signal from said imaging system.

2. A transducer apparatus as defined in claim 1 wherein said variable gain amplifier comprises a preamplifier circuit having an input coupled to said transducer and a variable gain amplifier circuit having an input coupled to an output of said preamplifier circuit and an output coupled to the second end of said cable.

3. A transducer apparatus as defined in claim 1 wherein the gain of said variable gain amplifier is controlled in response to said gain control signal to provide relatively high gain for low amplitude electronic signals and relatively low gain for high amplitude electronic signals.

4. A transducer apparatus as defined in claim 1 further including a transducer housing for mounting said transducer and said variable gain amplifier in close proximity to each other at the second end of said cable.

5. A transducer apparatus as defined in claim 1 wherein said transducer comprises a plurality of transducer elements for converting ultrasonic energy into electronic signals and wherein said variable gain amplifier comprises a plurality of variable gain amplifier circuits, each having an input coupled to one of said transducer elements and an output coupled to the second end of said cable.

6. A transducer apparatus as defined in claim 1 wherein said transducer comprises an array of transducer elements for converting ultrasonic energy into electronic signals and wherein said variable gain amplifier comprises a plurality of variable gain amplifier circuits, each having an input coupled to one or more of said transducer elements and an output coupled to the second end of said cable.

7. A transducer apparatus as defined in claim 1 wherein said transducer has a first impedance and said cable has a second impedance, and wherein said variable gain amplifier has an input impedance that is appropriately matched to said first impedance and an output impedance that is appropriately matched to said second impedance.

8. A transducer apparatus for use with an ultrasonic imaging system, said transducer apparatus comprising:
   a cable having a first end for coupling to said ultrasonic imaging system, and a second end;
   a transducer, located at the second end of said cable, for converting ultrasonic energy into electronic signals for transmission through said cable to said ultrasonic imaging system;
   a preamplifier, located at the second end of said cable, having an input coupled to said transducer and an output;
   a variable gain amplifier, located at the second end of said cable, having an input coupled to the output of said preamplifier and an output coupled to the second end of said cable; and
   means, located at the second end of said cable and responsive to a gain control signal from said imaging system, for varying the gain of said variable gain amplifier as said electronic signals are received.

9. A transducer apparatus as defined in claim 8 wherein said transducer comprises a plurality of transducer elements for converting ultrasonic energy into electronic signals, said preamplifier comprises a plurality of preamplifier circuits each having an input coupled to one of said transducer elements and an output, and said variable gain amplifier comprises a plurality of variable gain amplifier circuits each having an input coupled to the output of one of said preamplifier circuits and each having an output coupled to the second end of said cable.

10. A transducer apparatus as defined in claim 9 wherein each of said variable gain amplifier circuits is responsive to said gain control signal from said imaging system.

11. A transducer apparatus as defined in claim 9 further including a transducer housing for mounting said transducer, said preamplifier and said variable gain amplifier in close proximity to each other at the second end of said cable.

12. A transducer apparatus as defined in claim 8 wherein said transducer comprises an array of transducer elements for converting ultrasonic energy into electronic signals, said preamplifier comprises a plurality of preamplifier circuits each having an input coupled to one or more of said transducer elements and an output, and said variable gain amplifier comprises a plurality of variable gain amplifier circuits each having an input coupled to the output of one of said preamplifier circuits and each having an output coupled to the second end of said cable.

13. A transducer apparatus for use with an ultrasonic imaging system, the imaging system comprising signal receiving circuitry for receiving signals from said transducer apparatus, said signal receiving circuitry being capable of receiving a first range of signal amplitudes, the transducer apparatus comprising:
   a cable having a first end for coupling to said ultrasonic imaging system, and a second end;
   a transducer, located at the second end of said cable, for converting ultrasonic energy into electronic signals having a second range of amplitudes greater than said first range; and
   means, coupled between said transducer and the second end of said cable, for mapping said second range of signals from said transducer to a range not greater than said first range of signals.

14. The transducer apparatus of claim 13 wherein said means for mapping comprises a variable gain amplifier which receives a gain control signal from said receiving circuitry in the imaging system and a preamplifier coupled between the transducer and said variable gain amplifier.

15. The transducer apparatus of claim 14 wherein said gain control signal received from the receiving circuitry causes a gain of said variable gain amplifier to vary with time as signals are received by said transducer.

16. The transducer apparatus of claim 13 wherein said transducer comprises a plurality of transducer elements and said means for mapping comprises means for mapping the signals from each of the transducer elements.

17. The transducer apparatus of claim 13 wherein said transducer comprises a plurality of transducer elements and said means for mapping comprises a plurality of variable gain amplifiers coupled to said transducer elements, each of said variable gain amplifiers receiving a gain control signal.

18. The transducer apparatus of claim 13 wherein said transducer has a first impedance and said cable has a second impedance, and wherein said means for mapping has an input impedance that is appropriately matched to said first impedance and an output impedance that is appropriately matched to said second impedance.

19. The transducer apparatus as defined in claim 13 wherein said transducer comprises an array of transducer elements for converting ultrasonic energy into electronic signals and said means for mapping comprises a plurality of variable gain amplifiers, each having an input coupled to one or more of said transducer elements and an output coupled to the second end of said cable.

* * * * *